(No Model.) 2 Sheets—Sheet 1.
A. G. WATERHOUSE.
METHOD OF REGULATING ELECTRIC CURRENTS.
No. 518,360. Patented Apr. 17, 1894.
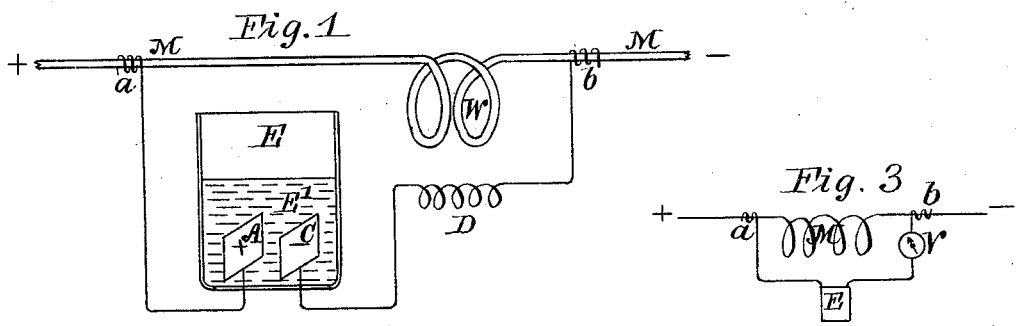
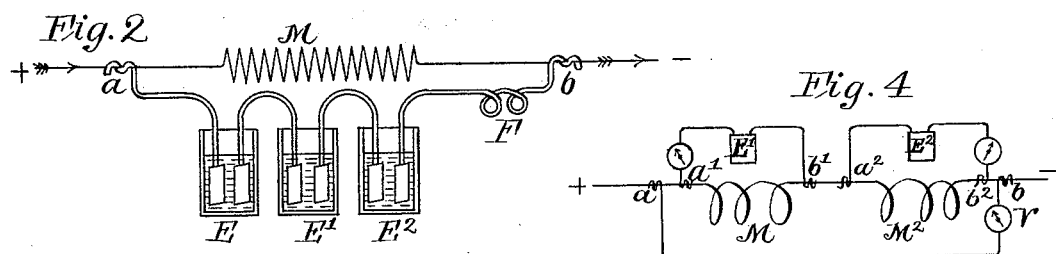
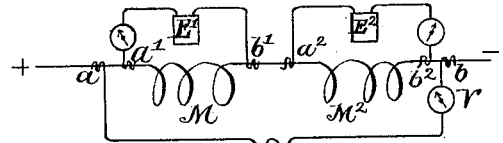
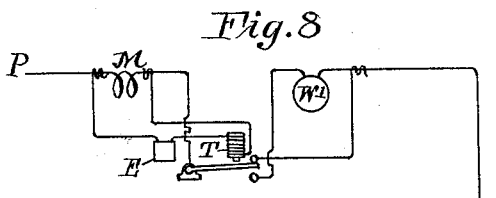
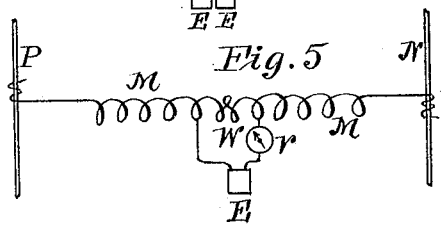
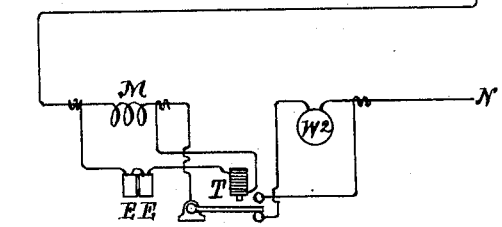
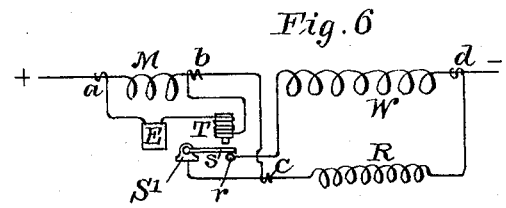
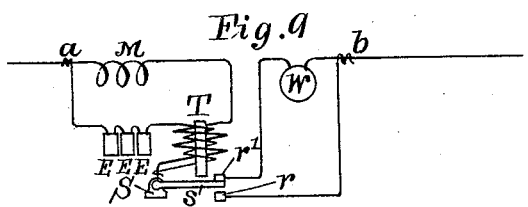
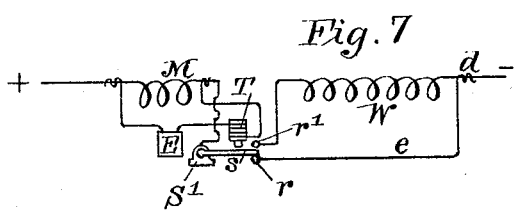
Witnesses:
William A. Lorenz.
Frank G. Waterhouse.
Inventor:
Addison G. Waterhouse (No Model.) 2 Sheets—Sheet 2.
A. G. WATERHOUSE.
METHOD OF REGULATING ELECTRIC CURRENTS.
No. 518,360. Patented Apr. 17, 1894.
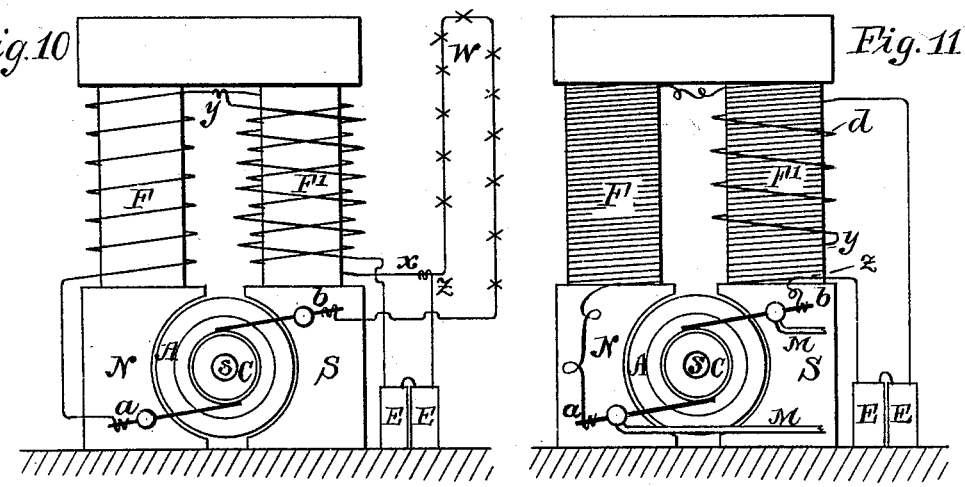
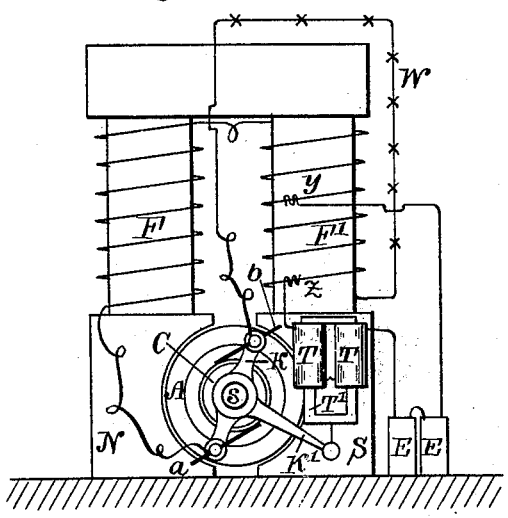
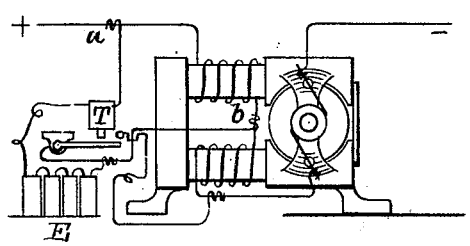
Witnesses:
William A. Lorenz
Frank G. Waterhouse
Inventor:
Addison G. Waterhouse

UNITED STATES PATENT OFFICE.

ADDISON G. WATERHOUSE, OF HARTFORD, CONNECTICUT, ASSIGNOR TO THE WATERHOUSE ELECTRIC COMPANY, OF CONNECTICUT.

METHOD OF REGULATING ELECTRIC CURRENTS.

SPECIFICATION forming part of Letters Patent No. 518,360, dated April 17, 1894.

Application filed April 13, 1892. Renewed March 15, 1894. Serial No. 503,797. (No model.)

*To all whom it may concern:*

Be it known that I, ADDISON G. WATERHOUSE, a citizen of the United States, residing at the city of Hartford, in the State of Connecticut, have invented a new and useful method of controlling, regulating, and directing electric currents, and of regulating the energy and work of dynamo-electric machines, motors, and other electric devices, of which the following is a specification.

My invention consists of the employment of the natural and constant unit of opposing force which an electrolytic cell offers to the passage through it of an electric current, which opposing force is independent of the resistance of the cell and acts as a constant counter E. M. F. (electro motive force) to the passage of a current, which force may vary in cells having different compounds as electrolytes, but remains practically constant in any one kind of a cell; the resistance of a cell may vary with the material used as an electrolyte, and the size, separation, and specific resistance of the material used for electrodes; but for the sake of a clear understanding, we will suppose this resistance to be reduced to a minimum and to be practically nothing, while the counter electromotive force of a cell would equal 1.5 volts. Under this condition, it is plain that no current having an electromotive force of less than 1.5 volts could pass through such a cell, while a current having an electromotive force above 1.5, could readily pass through.

With this understanding, I will state that my invention consists in making use of the counter electromotive force offered by an electrolytic cell, or a series of such cells, to prevent the passage of a current through them when the electromotive force of such current falls below the counter electromotive force offered by such cell or cells, and to offer a passage for a current through such cell or cells when the electromotive force of such current rises above and overcomes the counter electromotive force offered by such cell or cells. The methods of using these electrolytic cells for the purposes embraced in this invention will be set forth by referring to the accompanying drawings, in which—

Figure 1, shows the elements involved in my invention, consisting of a low resistance conductor having a coil representing work placed upon the same, and a derived circuit placed around such work, consisting of an electrolytic cell and a coil of fine wire representing work. Fig. 2, is a modification of Fig. 1, in which a main circuit having work representing a high resistance is shunted by a low resistance conductor, having several electrolytic cells in series and work represented by a low resistance coil. Figs. 3, 4, and 5, are modifying forms of Figs. 1 and 2. Figs. 6, 7, 8, and 9, represent resistance coils and work placed on main circuit conductors, and conductors placed around the resistance, having electrolytic cells, through which part of the current passes, and various forms of current breaking and current diverting devices for interrupting and diverting the current from passing through the work on the main line. Figs. 10, 11, and 12, show applications of my invention for regulating dynamo-electric machines and motors. Fig. 13, shows an application of the same to a motor, adapted to be run on an arc light circuit. Fig. 14, represents a resistance working device.

In describing the practical applications of my invention, we will refer to Fig. 1, which shows a main conductor M of low resistance, having work placed thereon, represented by the coil W, and connected at *a*, is a conductor forming part of a shunt circuit leading to an electrode A in the electrolytic cell E, then through the electrolytic fluid E' to the second electrode C and out on a conductor forming coil D to the point of contact "*b*." A current is supposed to pass through the main conductor M from left to right. The counter electromotive force offered to the passage as a current by the cell E is assumed to be 1.5 volts, and therefore a current passing through conductor M and work W of an intensity below that which would cause a difference of potential of 1.5 volts between points *a* and *b*, would not force a current through the shunt circuit in which the cell E is placed, but any increase of current through the line M and work W which would cause a difference of potential between *a* and *b* to exceed 1.5 volts, would cause a current to pass through the shunt and cell E. Therefore, any current passing through line M and work W, if below a certain intensity, would not pass through this shunt, while a current above a certain intensity would pass through it, and in doing so, would also pass through coil D, which may be made use of for the various purposes to be hereinafter set forth. Hence the current in either branch may be regulated or controlled by adjusting the number of cells or their electro-motive force to the potential or electro-motive force given, at which it is desired that they should allow current to pass either for the purpose of affecting the current flow in the branch containing the cells or in the branch to which they are a shunt.

Fig. 2, shows a main circuit M, of a comparatively high resistance and a shunt circuit of very low resistance. This shunt circuit being connected at $a$, and having placed in it the electrolytic cells E, E', E² and a working coil F. If a current of a certain intensity should pass through coil M, which would cause a difference of potential between $a$ and $b$ less than the counter electromotive force offered by the cells E, E', E², no current would pass through such cells; but if the current passing through M, should increase so as to raise the difference of potential between $a$ and $b$ to a point above the opposing force offered by these cells, a current would then pass through them; and in case the resistance of the coil M was ten times greater than that of the shunt in which the shells were placed, any excess of current above that which would overcome the opposing force of the cells in the shunt circuit or at least the greater part of it would overflow or pass through the shunt, and therefore any current below or not exceeding a certain intensity would pass through the coil M and not through the shunt, while an increase of current above a certain intensity would mostly overflow or pass through the shunt, and therefore cause the current passing through M to be comparatively constant independent of any current changes on the line from + to −.

Fig. 3, shows a main circuit coil M and an electrolytic cell E, and ampèremeter V placed in a derived circuit around M. When the current is increased so that the voltage between $a$ and $b$ rises to 1.5 volts, the current just begins to pass through the cell E and ammeter V. Below 1.5 volts none passes and as the resistance of E and V is very low, any considerable increase of current intensity does not materially increase the voltage between $a$ and $b$, showing that no more current is passing through M, while the ammeter V shows nearly all the surplus current above that required to raise the voltage between $a$ and $b$ to 1.5 volts to be passing through the cell E and instrument V.

Fig. 4, shows a double arrangement of the combination shown in Fig. 3, showing two coils, M and M² on the main line, with a shunt placed around both in the form or two cells E, E, and the measuring instrument V, while each coil, M and M², has cells and instruments placed around them as shown in Fig. 3.

Fig. 5, shows a high resistance coil M placed between two main conductors P and N, with a cell E and instrument V, placed around the part of the coil M designated by W, the same as shown in Fig. 3.

Fig. 6, represents a main circuit beginning at the sign + forming coil M, then extending down to the pivot bearing S', then across the armature $s$ to contact point $r$, then up through the conductor, which forms the coil W, then out on the end of the line marked −. There is a resistance R placed around the work W, extending from the points $c$ to $d$. Of course, part of this current goes through resistance R, but the main part is supposed to go through the work W. Around the coil M is placed a shunt from $a$ to $b$, containing an electrolytic cell E and electromagnet T. Any excess of current passing through the main line overflows through E and T, as described in connection with Fig. 3; this energizing the magnet T, causes it to raise the armature $s$ from the contact point $r$, and this breaks the path of the main current W and compels it to pass through the resistance R. This simply shows a means of employing the overflow current for breaking or diverting the path of the main current.

Fig. 7, shows a device somewhat similar to Fig. 6, except that the armature $s$, which carries the main current, is placed between two contact points $r$, $r'$, and simply shows that when the magnet T raises the armature $s$ so as to contact with $r'$, the current passes through the work W, and when the current ceases in magnet T, the armature $s$ falls on point $r$ and the current passes around the work W through conductor $e$. It is plain that the wires leading from point $r$ and $r'$ may be crossed so that the current will pass through the work W, when the current ceases in magnet T, and will pass around the work, when the magnet T is energized.

Fig. 8, simply shows two devices similar to Fig. 7, placed in series; the upper one having a single cell E, placed in the shunt around the coil M, while the lower one shows two cells E E placed around the coil M. The device shows that certain excess of current in the upper instrument will affect or divert the current in passing through W', while in the lower instrument, having the counter electromotive force of two electrolytic cells to overcome, it will take a greater excess of current to change the current in work represented by W². This device shows that two or more instruments may be placed on a line and each one of them can be separately and independently affected by the changes in the main circuit current.

Fig. 9, is a modification of one of the instruments shown in Fig. 8, showing that the main current in passing through coil M, passes around the magnet T, then to the pivot S' and armature $s$. In this way it energizes the magnet T and holds up the armature s to point r', so that the main current passes through the work W. The shunt circuit around coil M passes through the three electrolytic jars E E E, then around magnet T, in a direction opposite to that of the main current, so that when an excess of current passing through coil M overflows through the cells E, it neutralizes the magnetism in T, and allows the armature s to drop to r, which diverts the current around work W, to point of contact b, while this excess of current continues. When the current falls to its normal limit so that the overflow through cells E discontinues, then the main current acting on magnet T, draws the armature S up to point r', when the current resumes its course through the work W.

Fig. 10, shows an application of my invention to dynamo electric machines. This shows a series or arc light machine, showing the pole pieces N and S, field magnets F and F', armature A, commutator C, and central shaft s, also contact brushes a and b. The current passing out at a, passes around the field coil F, then around field coil F' in a direction to magnetize the field poles N and S, as marked, then out on line x to the lights or work W, then back on brush b. Part of the field coils of the main circuit are shunted or have a derived circuit around the part of it included between y and z. This derived circuit starting at y, forms a coil around the field magnet F', so that the current passing through the derived circuit will pass in an opposite direction to the main circuit on magnet F'. This derived circuit also passes through the electrolytic cells E E. Any suitable number of these cells may be used. The derived circuit passing from the cells E E, joins the main circuit at z. The operation of this device is the same as shown in relation to Fig. 3; that is, any excess of main current causes an increased voltage in that part of the main circuit between the points of contact y and z; this causes an overflow through the cells E and E, and in the part of the derived circuit coiled around magnet F' in a direction opposite to the main circuit on F'. This counteracting the magnetic strength of the fields and reducing the energy of the machine in a way to prevent an excess of current above a standard intensity which, when not exceeded, will not force an overflow of current through the cells E E, and therefore, not cripple or reduce the efficiency of the machine at any time except when the current, by reason of a reduction in resistance on its working circuit causes it to attempt to generate a current in excess of a fixed intensity, which excess is instantly prevented or checked by the means described.

Fig. 11, shows a dynamo-electric machine of the derived circuit type, adapted for producing a constant electro motive force. The field magnets F and F' are energized by derived circuit coils, the terminals of which are fixed to the brushes a and b. Around part of the derived circuit forming magnet F', that is the part between y and z, is a shunt, which starts from the field coil at contact point y, then extends upward and forms the superposed coil d, then down on the conductor to the electrolytic cells E E, and up on a conductor to the point z where it again joins the field magnet F'. In case of an excess of current through the derived circuit coil F', the voltage would be increased so as to force an overflow current through the cells E, E, which current would pass around the coil d in a direction opposite to the current in coil F', and this would counteract the field magnetism and prevent such excess of voltage on current.

Fig. 12, shows a series of arc light generators similar to Fig. 10, in which the contact brushes a and b, are held by the rocker k, which is free to swing on the small shaft s. Connected to this rocker by the arm K', is an electro-magnet T, with a movable armature T'. Any rise or fall of this armature T' will shift the rocker K and contact brushes a and b forward and back and thus change the energy of the machine. The main current starting at brush a, passes around the field magnet coil F, then around the field magnet coil F', then to the lights or work W, then back to brush b. The part of the main circuit forming coil F' between y and z, is shunted by a derived circuit leading from y to the electrolytic cells E E, then around the coils forming the electro-magnet T T, then to the point of contact z. As before explained, an excess of current in the main circuit will increase the voltage between y and z and cause an overflow current through the cells E E and electro-magnet T T. This will energize the magnet T T and raise the armature T', thereby shifting the brush holder K and moving the brushes ahead so as to reduce the energy of the machine and prevent an excess of current. It is obvious that many combinations can be made, such as causing the overflow current in the cells E E to reduce the field magnetism, as shown in Figs. 10 and 11, while at the same time shifting the brushes as shown in Fig. 12; or the overflow current may be used to divert the main current through instruments adapted for regulating dynamo-electric machines, motors, or any electrical instruments, as shown in Figs. 1 to 9, inclusive; also as shown in Fig. 14, to be hereinafter described.

Fig. 13, shows an electric motor of the series type, or such as are adapted to work on arc light circuits, showing that any part of the machine, either the fields, armature, or all of the same can be shunted by a derived circuit, having exceedingly low resistance as in Fig. 2, which is adapted to drain all the surplus of current above a certain intensity, or this motor may be regulated by any of the means shown in Figs. 10, 11, and 12. In this case is shown part of the field magnets shunted by a derived circuit, having electrolytic cells E and electro-magnet T, which magnet is used to work a circuit-breaking device, which diverts the current from around another part of the field magnet coils. It is obvious that the electrolytic cells E and magnet T can be placed as a shunt around a resistance on any part of the working circuit instead of around a part of the field magnet coils and the overflow of this derived circuit may be used to work regulating devices of any form whatever.

Fig. 14, shows a modification of the instruments show in Figs. 6, 7, 8, and 9. It is simply to show that instead of making a make and break contact for diverting or interrupting the current, any form of step by step, or a resistance working device may be used and operated by the overflow current passing through the electrolytic cell E and magnet T T. In this case, the armature T' works the lever L, pivoted at L' and moves the slide O on the contact points P, thereby cutting out more or less of the resistance R. This, or similar devices may be worked by the overflow current which operates a variable resistance around the field magnets of dynamo electric machines or motors, or a resistance in series with derived circuit field magnet coils as shown in Fig. 11; or may be used to divert the current by working step by step connections to field magnet coils belonging to dynamo electric machines, or motors or other electrical devices.

In speaking of the application of my invention, I have assumed that I have been dealing with continuous currents, but it is obvious that the same invention will apply to alternating currents, undulating currents or intermittent currents.

In the construction of such electrolytic cells as may be adapted for the purposes set forth in my invention, I use electrodes composed of non-attackable material, preferably such as carbon or platinum, in order to avoid the production of secondary or reverse currents in the cells and reduce such currents to a minimum so that they will not materially or practically interfere with the purposes of my invention. Any composition which will be subject to electrolytic decomposition by the passage of a current through it will do for an electrolyte whether in a liquid, dry or hygrometric form.

It is plain that primary or secondary batteries capable of producing and maintaining a current would not do for the purposes of my invention for the reason that if such batteries were used in place of the electrolytic coil $w$ shown in Fig. 1, such a battery would, upon a discontinuance of a current upon the main line M, through the resistance W, set up a current in the local circuit formed by the main conductor M, resistance W, and the shunt conductors leading from $a$ and $b$ to the battery, which would soon cause the battery to weaken and destroy its usefulness. Referring to Fig. 10, in case the coils E E, were current producing batteries, upon the discontinuance of the current produced by the dynamo, a local current would be set up by such batteries in the shunt circuit, which would disturb the residual magnetism in the field magnet F' so as to reverse the polarity of the dynamo, or at least, disturb its field magnetism in a way to prevent the dynamo, when started, from picking up or generating a current.

Again referring to Fig. 1: If the cell E were a current producing battery, it would offer a counter electro motive force against a current in but one direction, and would assist or work in series with a current from an opposite direction. This would not only be objectionable for the reason stated in producing a local current, but would not apply for offering a counter electro motive force against a current which would be liable to change its polarity, or a current of an alternating nature. While in the case of an electrolytic cell a counter electro motive force would be offered to a current in both directions, and any polarized or secondary currents which would be produced in such cells could be reduced by the use of non-attackable electrodes to a minimum, or to so small a factor as to not interfere with the purposes of my invention.

What I claim as my invention is—

1. The method of regulating an electric current by first forming a derived circuit current and opposing its passage by the counter electromotive force of one or more sets of electrolytic elements having non-attackable electrodes, and second, in employing the magnetic effect of said derived circuit current for the purpose of regulating a current, substantially as and for the purposes set forth.

2. The method of regulating an electric current by first, forming a derived circuit current and opposing its passage by the counter electromotive force of one or more sets of electrolytic elements having non-attackable electrodes, and second, in employing the said derived circuit current for actuating a current regulating device, substantially as, and for the purposes set forth.

3. The combination with a main circuit, the electrical constants of which are known and the current in which is to be maintained below a fixed limit, of a regulating circuit placed as a shunt around said main circuit and including an electrolytic pile having non-attackable electrodes, substantially as described.

4. The combination with a main circuit the current in which is to be maintained below a fixed limit, of a regulating shunt circuit including an electrolytic pile having non-attackable electrodes, and a resistance, substantially as described.

5. The combination with a main circuit, the current in which is to be maintained below a fixed limit, of a regulating shunt circuit including an electrolytic pile, having non-attackable electrodes, and arranged in such relation with the said main circuit that when a current flows in the shunt circuit the electrical condition of the said main circuit will be altered, substantially as described.

6. The combination with a main circuit the current in which is to be regulated, of a shunt circuit including an electrolytic pile having non-attackable electrodes, and apparatus which is actuated by a current flowing in the shunt circuit so as to alter the electric conditions of the main circuit, substantially as described.

7. The combination with a main circuit the current in which is to be regulated, of a shunt circuit including an electrolytic pile having non-attackable electrodes, and an electro-magnetic device which is actuated by a current flowing in the shunt circuit and is thereby caused to alter the electrical conditions of the main circuit, substantially as described.

8. The combination with a main circuit the current in which is to be regulated, of a shunt circuit including an electrolytic pile having non-attackable electrodes and an electro-magnetic device which is operated by a current flowing in the shunt circuit to divert the current in the main circuit, substantially as described.

9. The herein described method of regulating or controlling an electric current in either of two branches of a circuit, consisting in opposing the passage of current in either of them by the counter electro-motive force of one or more electrolytic elements having non-attackable electrodes, and adjusted as described, in their counter electro-motive force to the potential at which it is desired that current should flow or cease to flow, as and for the purpose set forth.

ADDISON G. WATERHOUSE.

Witnesses:
FREDERICK W. DAVIS,
FRANK G. WATERHOUSE.